United States Patent
Yu et al.

(10) Patent No.: US 10,602,541 B2
(45) Date of Patent: Mar. 24, 2020

(54) DEVICE, METHOD, AND SYSTEM FOR PROCESSING RANDOM ACCESS PROCEDURES

(71) Applicant: Huawei Technologies Co., Ltd., Shenzhen (CN)

(72) Inventors: Feng Yu, Beijing (CN); Yinghui Yu, Beijing (CN); Juan Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/971,390

(22) Filed: May 4, 2018

(65) Prior Publication Data
US 2018/0255575 A1 Sep. 6, 2018

Related U.S. Application Data

(63) Continuation of application No. PCT/CN2015/093925, filed on Nov. 5, 2015.

(51) Int. Cl.
*H04W 74/08* (2009.01)
*H04W 4/70* (2018.01)

(52) U.S. Cl.
CPC ............. *H04W 74/08* (2013.01); *H04W 4/70* (2018.02); *H04W 74/0833* (2013.01)

(58) Field of Classification Search
CPC .... H04W 74/08; H04W 4/70; H04W 74/0833
See application file for complete search history.

(56) References Cited

U.S. PATENT DOCUMENTS

| | | | | |
|---|---|---|---|---|
| 2011/0317636 A1* | 12/2011 | Diachina | ........... | H04W 74/0833 370/329 |
| 2012/0063305 A1* | 3/2012 | Chiu | ................. | H04W 74/0833 370/230 |
| 2012/0220325 A1* | 8/2012 | Zhou | ................. | H04W 74/0833 455/509 |
| 2015/0009813 A1* | 1/2015 | Nguyen | .............. | H04W 74/002 370/230 |

(Continued)

FOREIGN PATENT DOCUMENTS

| | | |
|---|---|---|
| CN | 101841776 A | 9/2010 |
| CN | 102291836 A | 12/2011 |

(Continued)

*Primary Examiner* — Walli Z Butt
(74) *Attorney, Agent, or Firm* — Slater Matsil, LLP

(57) ABSTRACT

This application relates to wireless communications technologies, and in particular, to a random access device, method, and system. In a network device provided in this application, a processing module is configured to determine a same processing result for random access procedures initiated by N terminal devices in M terminal device sets, where M and N are positive integers; and a sending module is configured to send a same random access control message to the N terminal devices, where the random access control message indicates the same processing result determined by the processing module, the message includes terminal set identification information, and the terminal set identification information identifies the N terminal devices. The network device uses a same random access reject message to indicate the same processing result for the random access procedures to the N terminal devices.

20 Claims, 9 Drawing Sheets

(56) References Cited

U.S. PATENT DOCUMENTS

2016/0165378 A1\* 6/2016 Harsha ................ H04W 74/008
  370/329
2016/0338110 A1 11/2016 Wang et al.

FOREIGN PATENT DOCUMENTS

| CN | 102651853 A | 8/2012 |
| CN | 102917433 A | 2/2013 |
| CN | 104780549 A | 7/2015 |

\* cited by examiner

DEVICE, METHOD, AND SYSTEM FOR PROCESSING RANDOM ACCESS PROCEDURES

CROSS-REFERENCE TO RELATED APPLICATIONS

This application is a continuation of International Application No. PCT/CN2015/093925, filed on Nov. 5, 2015, which is hereby incorporated by reference in its entirety.

TECHNICAL FIELD

This application relates to wireless communications technologies, and in particular, to a random access device, method, and system.

BACKGROUND

In a Long Term Evolution (LTE) system, user equipment (UE) may establish a connection and synchronize an uplink with a cell using a random access procedure. The UE may perform uplink transmission only after the uplink has been synchronized.

Similarly, in a machine-to-machine (M2M) system, UE may also require a random access procedure to establish a connection and complete uplink synchronization.

Slightly different from the LTE system, there is a random access reject message in the M2M system in addition to a random access response message. As shown in FIG. 1, after receiving a random access request (Random Access Request) message sent by UE, an evolved NodeB (eNB) may notify, using a random access response (Random Access Response) message, the UE of access, or may reject UE access by sending a random access reject (Random Access Reject) message, and may tell the UE to wait for a period of time and then re-initiate a random access procedure. Both messages may be sent on a physical downlink control channel (PDCCH).

Generally, there is a huge quantity of UEs in a M2M system. For example, a monitoring network may include tens of thousands of monitoring nodes. Within a period of time, there may be a large quantity of nodes that initiate random access, and random access response or reject messages may be sent on PDCCHs. In addition, PDCCH resources may also be used for sending a scheduling message or a paging message. As a result, the PDCCH resources may become limited.

For example, in some emergency scenarios such as a fire warning, many UEs may detect an emergency. For example, when a fire breaks out, a large quantity of UEs may initiate a random access procedure within a short period of time, and an evolved NodeB (eNB) may need to send random access response or reject messages to these UEs on PDCCHs based on a network load status. In a case such as this, the PDCCHs may become even more limited than described above.

In conclusion, in a current wireless communications system such as the M2M system, control channels may become limited when random access procedures initiated by a plurality of terminal devices need to be processed within a short period of time.

SUMMARY

In view of this, a random access device, method, and system are provided, to resolve a problem in which control channels may become limited during random access procedures.

According to a first aspect, this application provides a network device, including a processing module and a sending module. The a processing module is configured to determine a same processing result for random access procedures initiated by N terminal devices in M terminal device sets, where M and N are positive integers. The sending module is configured to send a same random access control message, to the N terminal devices, that initiates the random access procedures, where the random access control message indicates the same processing result determined by the processing module, and where the message includes terminal set identification information, and the terminal set identification information identifies the N terminal devices.

According to a second aspect, this application provides a network device, including a processor and a transmitter. The processor is configured to determine a same processing result for random access procedures initiated by N terminal devices in M terminal device sets, where M and N are positive integers. The transmitter is configured to send a same random access control message, to the N terminal devices, that initiates the random access procedures, where the random access control message indicates the same processing result determined by the processor, and where the message includes terminal set identification information, and the terminal set identification information identifies the N terminal devices.

According to a third aspect, this application provides terminal device, including a receiving module and a processing module. The receiving module is configured to receive a random access control message that is sent by a network device in response to a random access procedure initiated by the terminal device. The processing module is configured to: obtain terminal set identification information in the random access control message received by the receiving module, where the terminal set identification information identifies N terminal devices in M terminal device sets, and M and N are positive integers; and when determining that the terminal set identification information includes an identifier of the terminal device, determine, based on the random access control message, a processing result that the network device determines for the random access procedure initiated by the terminal device.

According to a fourth aspect, this application provides terminal device, including a receiver and a processor. The receiver is configured to receive a random access control message that is sent by a network device in response to a random access procedure initiated by the terminal device. The processor is configured to: obtain terminal set identification information in the random access control message received by the receiver, where the terminal set identification information identifies N terminal devices in M terminal device sets, and M and N are positive integers; and when determining that the terminal set identification information includes an identifier of the terminal device, determine, based on the random access control message, a processing result that the network device determines for the random access procedure initiated by the terminal device.

According to a fifth aspect, this application provides a random access method, including: determining, by a network device, a same processing result for random access procedures initiated by N terminal devices in M terminal device sets, where M and N are positive integers; and sending, by the network device, a same random access control message to the N terminal devices that initiate the random access procedures, where the random access control message indicates the same processing result, the message includes terminal set identification information, and the terminal set identification information identifies the N terminal devices.

According to a sixth aspect, this application provides a random access method, including: receiving, by a terminal device, a random access control message that is sent by a network device in response to a random access procedure initiated by the terminal device obtaining, by the terminal device, terminal set identification information in the random access control message, where the terminal set identification information identifies N terminal devices in M terminal device sets, and M and N are positive integers; and when determining that the terminal set identification information includes an identifier of the terminal device, determining, by the terminal device based on the random access control message, a processing result that the network device determines for the random access procedure initiated by the terminal device.

According to a seventh aspect, this application provides a wireless communications system, including: a network device, configured to: determine a same processing result for random access procedures initiated by N terminal devices in M terminal device sets, where M and N are positive integers; and send a same random access control message to the N terminal devices that initiate the random access procedures, where the random access control message indicates the same processing result, the message includes terminal set identification information, and the terminal set identification information identifies the N terminal devices. The wireless communication system may also include a terminal device, configured to: receive a random access control message that is sent by the network device in response to a random access procedure initiated by the terminal device; obtain terminal set identification information in the random access control message; and when determining that the terminal set identification information includes an identifier of the terminal device, determine, based on the random access control message, a processing result that the network device determines for the random access procedure initiated by the terminal device.

In this application, the network device sends the same random access control message for the random access procedures initiated by the N terminal devices in the M terminal device sets, where the same random access control message indicates the same processing result that the network device determines for the N terminal devices, the message includes the terminal set identification information that is used to identify the N terminal devices; and after receiving the random access control message, the terminal device obtains the terminal set identification information in the message, and when the N terminal devices identified by the terminal set identification information include the terminal device, determines, based on the received random access control message, the processing result that the network device determines for the random access procedure initiated by the terminal device, where M and N are positive integers.

Further, in other embodiments of the present invention, the network device uses a same random access reject message to indicate the same processing result for the random access procedures to the N terminal devices in the M terminal device sets. This can reduce the likelihood of control channel resources becoming occupied for sending random access reject messages, and may resolve a problem that control channels may become limited during random access procedures.

With reference to any one of the foregoing aspects, in a first possible implementation, when M=1, the random access control message may be sent in a resource location that corresponds to a same terminal device set to which the N terminal devices belong and that is in a downlink control channel.

The terminal devices in the set may share the same resource location in the downlink control channel, thereby possibly reducing occupancy of downlink control channel resources.

With reference to the first possible implementation, in a second possible implementation of any one of the foregoing aspects, before the same random access control message is sent to the N terminal devices, channel resource location information may be broadcast, where the channel resource location information may indicate the same resource location.

In this way, the terminal devices may learn of, in advance, a resource location occupied by the random access control message, so as to receive the random access control message.

With reference to any one of the foregoing aspects, in a third possible implementation, when M≥2, the random access control message may be sent in a same resource location that is in a downlink control channel and that corresponds to the M terminal device sets.

The terminal devices in the M terminal device sets may share the same resource location in the downlink control channel, possibly further reducing occupancy of downlink control channel resources.

With reference to the third possible implementation, in a fourth possible implementation of any one of the foregoing aspects, before the same random access control message is sent to the N terminal devices, channel resource location information may be broadcast, where the channel resource location information may indicate the same resource location that corresponds to the M terminal device sets and that is in the downlink control channel.

In this way, the terminal devices may learn of, in advance, a resource location occupied by the random access control message, so as to receive the random access control message.

With reference to any one of the foregoing aspects or any possible implementation of any aspect, in a fifth possible implementation, all terminal devices in each terminal device set may have at least one of the following characteristics: belonging to a same coverage class; device identifiers belonging to a same device identifier set; or belonging to a same priority set.

Unified processing may be implemented for terminal devices with a same characteristic.

With reference to any one of the foregoing aspects or any possible implementation of any aspect, in a sixth possible implementation, the terminal set identification information may include one or more of the following information: type information, where the type information may indicate a same terminal device type to which the N terminal devices belong; and region information, where the region information may indicate a same random access resource region in which random access resources used by the N terminal devices in the initiated random access procedures are located.

If terminal set identification information includes type information, a terminal device type may be used to identify N terminal devices, to instruct the N terminal devices to receive a random access control message, and to determine a result for random access procedures. The terminal device can determine that the received random access control message includes the processing result for a random access procedure initiated by the terminal device, only when a type of the terminal device is a type indicated by the type information.

If terminal set identification information includes region information, a random access resource used by the terminal device to initiate a random access procedure may be used to identify N terminal devices, to instruct the N terminal devices to receive a random access control message, and to determine a result for random access procedures. The terminal device can determine that the received random access control message includes the processing result for a random access procedure initiated by the terminal device, only when a random access resource used by the terminal device to initiate the random access procedure is in a random access resource region indicated by the region information.

If terminal set identification information includes type information and region information, a random access resource may be used by terminal device to initiate a random access procedure and a terminal device type may be used to identify N terminal devices, instruct the N terminal devices to receive a random access control message, and determine a result for random access procedures. The terminal device can determine that the received random access control message includes the processing result for a random access procedure initiated by the terminal device, only when a random access resource used by the terminal device to initiate the random access procedure is in a random access resource region indicated by the region information and a type of the terminal device is a type indicated by the type information.

With reference to the sixth possible implementation of any one of the foregoing aspects, in a seventh possible implementation, the region information may include a random access resource frame number and intra-frame location information; wherein the random access resource frame number may indicate a frame number of a random access resource frame in which the same random access resource region is located; and wherein the intra-frame location information may indicate a location of the same random access resource region in the frame indicated by the random access resource frame number; and the intra-frame location information may include frequency domain starting location information, frequency domain ending location information, time domain starting location information, and time domain ending location information; or the intra-frame location information may include frequency domain starting location information, a frequency domain bandwidth, time domain starting location information, and time domain duration; or the intra-frame location information may include time domain location information, where the same random access resource region may occupy, in frequency domain, an entire bandwidth occupied by a random access channel, and may occupy, in time domain, one or more time units indicated by the time domain location information; or the intra-frame location information may include frequency domain location information, where the same random access resource region may occupy, in frequency domain, one or more frequency domain units indicated by the frequency domain location information, and may occupy, in time domain, an entire time period occupied by a random access channel; or the intra-frame location information may include one or more random access channel resource indexes, where each random access channel resource index may indicate a random access channel resource used by terminal device to send a random access request message.

This optional implementation may provide a plurality of possible implementations of the region information.

With reference to the seventh possible implementation of any one of the foregoing aspects, in an eighth possible implementation, when the intra-frame location information includes one or more random access channel resource indexes, where each random access channel resource index indicates a random access channel resource used by terminal device to send a random access request message, before the network device sends the random access control message, a correspondence between a random access channel resource index and a random access channel resource may be broadcast; or a correspondence between a random access channel resource index and a random access channel resource may be pre-stipulated in a protocol.

In this way, the terminal device may learn of, in advance, the correspondence between the random access channel resource index and the random access channel resource. That is, the terminal device may determine, based on a random access channel resource index in the terminal set identification information sent by the network device, whether the received random access control message includes the processing result for the random access procedure initiated by the terminal device.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
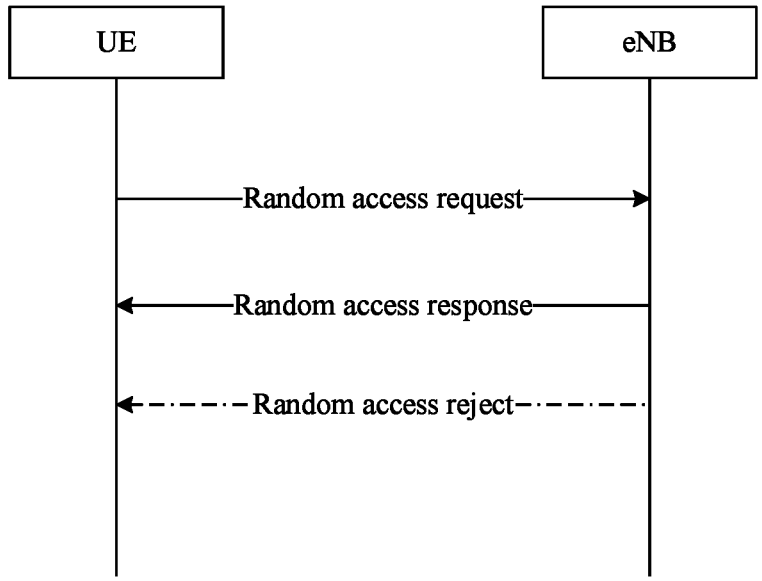
FIG. 1 is a flowchart of a random access procedure in an M2M system.

In this application, a network device may send a same random access control message for random access procedures initiated by N terminal devices in M terminal device sets, where the same random access control message may indicate a same processing result that the network device may determine for the N terminal devices. The random access control message may include terminal set identification information that may identify the N terminal devices. After receiving the random access control message, the terminal device may obtain the terminal set identification information comprised in the message when the N terminal devices identified by the terminal set identification information include the terminal device, the terminal device may determine, based on the received random access control message, the processing result that the network device determines for a random access procedure initiated by the terminal device, where M and N are positive integers.

The network device may use a same random access reject message to indicate the same processing result for the random access procedures to the N terminal devices in the M terminal device sets. This can reduce control channel resources occupied for sending random access reject messages, and may resolve a problem that control channels possibly become limited during random access procedures.

Further, the same random access control message for a same terminal device set may be sent in a same resource location in a downlink control channel. Therefore, the terminal devices in the set may share the same resource location in the downlink control channel, thereby potentially reducing occupancy of downlink control channel resources.

Alternatively, the same random access control message for the M terminal device sets may be sent in a same resource location in a downlink control channel. Therefore, the terminal devices in the M terminal device sets may share the same resource location in the downlink control channel, potentially further reducing occupancy of downlink control channel resources.

In a current M2M system, a random access response message and a random access reject message may both be sent on a UE dedicated PDCCH resource. After UE sends a random access request message to a base station on a random access channel (RACH) resource, the base station may send a random access response message or a random access reject message to the UE based on a current network congestion status. Random access from a large quantity of UEs in a short time may result in that when a network device sends random access response messages or random access reject messages to the large quantity of UEs, PDCCH resources may become limited.

A typical application scenario of a manner, proposed in this application, of sharing a resource location in a downlink control channel is described as follows.

In an M2M system, a network device may need to reject, due to network congestion, a random access procedure initiated by a terminal device. However, in the M2M system, due to network congestion, random access from a large quantity of terminal devices not merely a single terminal device may need to be usually rejected within a period of time. Therefore, when the manner of sharing a resource location in a downlink control channel is used, overheads of the downlink control channel can be reduced, resources saved may be used for sending proprietary information such as data transmission and scheduling for a terminal device, and data transmission efficiency can be further improved.

Currently, besides the foregoing scenario in the M2M system, when a network device sends random access response messages to a large quantity of terminal devices, a problem in that PDCCH resources become limited may also occur. This application can also resolve the problem in this scenario.

In addition, besides the M2M system, for another application scenario involving a random access procedure, this application may also be used to save a downlink control channel resource of a network device.

The following provides explanations for basic concepts involved in this application. It should be noted that these explanations are intended to make this application easier to understand, and should not be considered as a limitation on the protection scope required by this application.

1. Random Access Procedure

In a current wireless communications system, the random access procedure may be available in a contention-based manner and a non-contention based manner.

In non-contention based random access, a base station may allocate a corresponding preamble (Preamble) and an access resource to a terminal device. In contention-based random access, a terminal device may randomly select an access resource (for example, for an LTE system, the access resource may be an RACH resource) to send a preamble, then may receive a random access response, may send a Message3 (MSG3), and may receive a contention conflict resolution message.

2. M2M Communication

Figure 2:
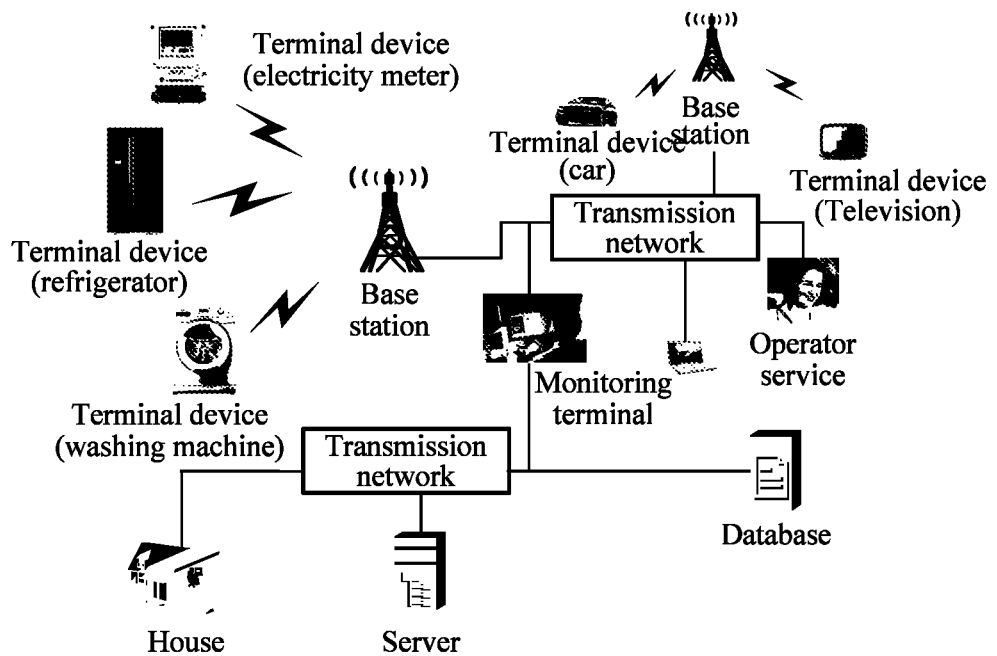
FIG. 2 is a schematic network structure diagram of an M2M system.

M2M communication is communication between machines in which the machines mutually transfer information and data using a wireless network or the like. M2M communication promises to be an important direction of next development of mobile communication. M2M communication has been widely applied in a plurality of fields, including intelligent transportation, building control systems, family intelligent control systems, video surveillance systems, industrial monitoring, and the like. A schematic network structure is shown in FIG. 2. In FIG. 2, a refrigerator, an electricity meter, a car, and the like each may be used as a terminal device in an M2M system, and communicate bi-directionally with another terminal device using a base station, a transmission network, or the like, for example, communication between the electricity meter and the car.

3. A possible reason for triggering a random access procedure in an M2M system may include but is not limited to the following items.

(1) A terminal device initiates a random access procedure in an initial access process.

For example, when a wireless connection is established during transition from a radio resource control (RRC) idle state (RRC_IDLE) to an RRC connected state (RRC_CONNECTED), the terminal device may initiate a random access procedure.

(2) A terminal device initiates a random access procedure in an RRC connection re-establishment procedure (RRC Connection Re-establishment procedure).

(3) A random access procedure is triggered when downlink data arrives.

A base station may have downlink data that may need to be sent to a terminal device, and may determine that the terminal device is in an RRC connected state, but the terminal device may be in an uplink out-of-synchronization state. In this case, the base station may instruct the terminal device to initiate a random access procedure.

(4) A random access procedure is triggered when uplink data arrives.

A terminal device may be in an RRC connected state. When the terminal device has uplink data that needs to be sent to a base station but finds that the terminal device is in an uplink out-of-synchronization state, the terminal device may initiate a random access procedure.

4. Random Access Control Message

The random access control message includes but is not limited to a random access response message and a random access reject message, and may be a response message sent by a network device for a random access request message sent by a terminal device.

The random access response message may indicate a response to a random access procedure initiated by the terminal device, that is, to allow a random access request from the terminal device. The random access reject message may indicate rejection of a random access procedure initiated by the terminal device.

5. Terminal Device Set

The terminal device set is a set that includes one or more terminal devices. Generally, one terminal device set includes a plurality of terminal devices. In this application, terminal devices in a same terminal device set have at least one of the following characteristics: (1) belonging to a same coverage class; (2) device identifiers belonging to a same device identifier set; or (3) belonging to a same priority set, for example, a service priority, a scheduling priority, or a paging priority.

The following describes the foregoing characteristics one by one.

(1) Coverage Class

In a coverage area of a cell, there may be located a plurality of terminal devices. Distances between the plurality of terminal devices and a base station may be different, the plurality of terminal devices may be in different wireless environments, and obstacles between the plurality of terminal devices and an antenna in the cell may also be different. As a result, when a same signal transmitted by the antenna in the cell arrives at the terminal devices, signal strength may be different. That is, for different terminal devices, signal reception strength may be different, and implemented coverage effects are different.

Based on different coverage effects, for example, based on attenuation of the signal when the signal arrives at the terminal device, the foregoing plurality of terminal devices may be divided into a plurality of coverage classes. For terminal devices that belong to a same coverage class, a similar coverage effect may be implemented.

(2) Device Identifier Set

For example, an even device identifier may belong to one device identifier set, and an odd device identifier may belong to another device identifier set.

For another example, a device identifier may be divided by 10 (a modulo operation). A device identifier with a remainder being 1 may belong to a device identifier set 1, a device identifier with a remainder being 2 may belong to a device identifier set 2, and the rest can be deduced by analogy. A device identifier with a remainder being 0 may belong to a device identifier set 10.

There are many methods for defining the device identifier set, not limited to the foregoing examples.

(3) Priority Set

For example, a service priority may be pre-defined, and terminal devices with a same or similar service priority may belong to a priority set.

For example, 10 service priorities 1 to 10 may be defined, and a priority with a smaller number may be higher than a priority with a larger number. Then, the priority sets may be defined as follows: a priority set 1 may include a priority 1 to a priority 4, a priority set 2 may include a priority 5 to a priority 7, and a priority set 3 may include a priority 8 to a priority 10.

For another example, a terminal device priority may be pre-defined, and a terminal device with a higher priority may have a higher probability of obtaining a network resource than a terminal device with a lower priority.

For example, four terminal device priorities 1 to 4 may be defined, and a priority with a smaller number may be higher than a priority with a larger number. Then, the priority sets may be defined as follows: a priority set 1 may include a priority 1 and a priority 2, and a priority set 2 may include a priority 3 and a priority 4.

There are many methods for defining the priority set, not limited to the foregoing examples.

6. Downlink Control Channel

A random access reject message may need to be sent using a downlink control channel. The downlink control channel may include one or more of a logical channel, a transmission channel, or a physical channel.

For example, the downlink control channel may be a physical channel. For example, the physical channel may be a PDCCH channel in a current M2M system.

7. Resource Location in a Downlink Control Channel

In this application, when sending a random access control message, a network device may use a downlink control channel to carry the random access control message.

M terminal device sets may be corresponding to a same resource location in the downlink control channel; or M terminal device sets may be corresponding to different resource locations in the downlink control channel. For example, the M terminal device sets may be corresponding to M different resource locations in the downlink control channel.

8. System and Network

The terms "system" and "network" are often used interchangeably in this application. The term "and/or" in this application describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

The foregoing describes the basic concepts involved in this application. The following describes this application in detail with reference to the accompanying drawings.

Figure 3:
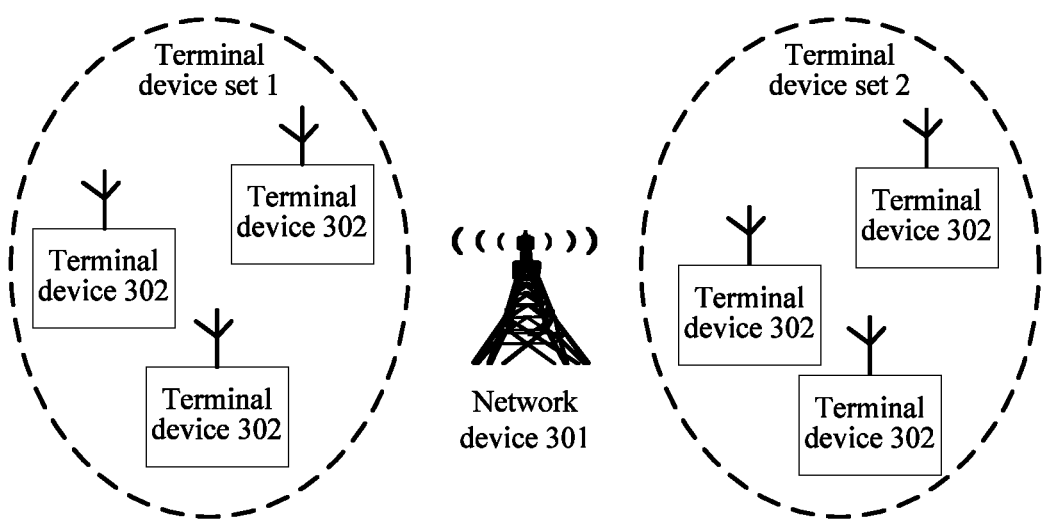
FIG. 3 is a schematic structural diagram of a wireless communications system provided in this application.

FIG. 3 shows a schematic structural diagram of a wireless communications system provided in this application. As shown in FIG. 3, the wireless communications system may include a network device 301 and N terminal devices 302. The N terminal devices 302 may belong to M terminal device sets (in FIG. 3, M=2 is used as an example, where a terminal device set 1 and a terminal device set 2 are included). M and N are positive integers, and M is not greater than N.

In the wireless communications system shown in FIG. 3, the N terminal devices 302 may send random access request messages to the network device 301 and initiate random access procedures. The network device 301 may determine a same processing result for the random access procedures initiated by the N terminal devices 302, and may send a same random access control message to the N terminal devices 302 to indicate the same processing result.

It should be noted that although only one network device 301 is shown, there may be a plurality of network devices 301 in an actual wireless application scenario.

In addition, it should be further noted that M and N being positive integers represents that the following plurality of cases may exist: the network device 301 may send a random access control message to one terminal device 302 in one terminal device set; the network device 301 may send a same random access control message to a plurality of terminal devices 302 in one terminal device set; and the network device 301 may send a same random access control message to a plurality of terminal devices 302 in a plurality of terminal device sets.

In no matter which case, when the same random access control message is sent to each terminal device in one terminal device set, control channel resources may be saved.

A communications standard used by the wireless communications system shown in FIG. 3 includes but is not limited to: a Global System for Mobile Communications (GSM), Code Division Multiple Access (CDMA), IS-95, Code Division Multiple Access (CDMA) 2000, Time Division-Synchronous Code Division Multiple Access (TD-SCDMA), Wideband Code Division Multiple Access (WCDMA), time division duplex-Long Term Evolution (TDD LTE), frequency division duplex-Long Term Evolution (FDD LTE), Long Term Evolution Advanced (LTE-Advanced), a personal handyphone system (PHS), Wireless Fidelity (Wi-Fi) stipulated by 802.11 series protocols, Worldwide Interoperability for Microwave Access (Wi-MAX), and various wireless communications systems evolved in the future.

The terminal device 302 may be a wireless terminal. The wireless terminal may be a device that provides voice and/or data connectivity for a user, a handheld device with a wireless connection function, or another processing device connected to a wireless modem. The wireless terminal may communicate bi-directionally with one or more core networks using a radio access network (for example, RAN, Radio Access Network). The wireless terminal may be a mobile terminal, such as a mobile phone (also referred to as a "cellular" phone), or a computer with a mobile terminal, for example, may be a portable, pocket-sized, handheld, computer built-in, or in-vehicle mobile apparatus, which may exchange language and/or data with the radio access network. For example, the wireless terminal may be a device such as a personal communications service (PCS) phone, a cordless phone, a Session Initiation Protocol (SIP) phone, a wireless local loop (WLL) station, or a personal digital assistant (PDA). The wireless terminal may also be referred to as a subscriber unit (SU), a subscriber station (SS), a mobile station (MS), a remote station (RS), an access point (AP), a remote terminal (RT), an access terminal (AT), a user terminal (UT), a user agent (UA), a user device (UD), or user equipment (UE).

The network device 301 may include a base station, or a radio resource management device configured to control a base station, or include a base station and a radio resource management device that is configured to control the base station. The base station may be a macro base station or a micro base station, for example, a small cell or a micro cell. The base station may also be a home base station, for example, a home NodeB (HNB) or a home eNodeB (HeNB). The base station may also include a relay node (relay) and the like.

For example, for an LTE system such as a TDD LTE, an FDD LTE, or an LTE-A system, the network device 101 in the wireless communications system provided in this application may be an evolved NodeB (eNodeB), and the terminal device 302 may be a UE. For a TD-SCDMA system or a WCDMA system, the network device 301 in the wireless communications system provided in this application may include a NodeB and/or a radio network controller (RNC), and the terminal device 302 may be a UE. For a GSM system, the network device 101 in the wireless communications system provided in this application may include a base transceiver station (BTS) and/or a base station controller (BSC), and the terminal device 302 may be a mobile station (MS). For a Wi-Fi system, the network device 301 may include an access point (AP) and/or an access controller (AC), and the terminal device 302 may be a station (STAtion, STA).

Figure 4:
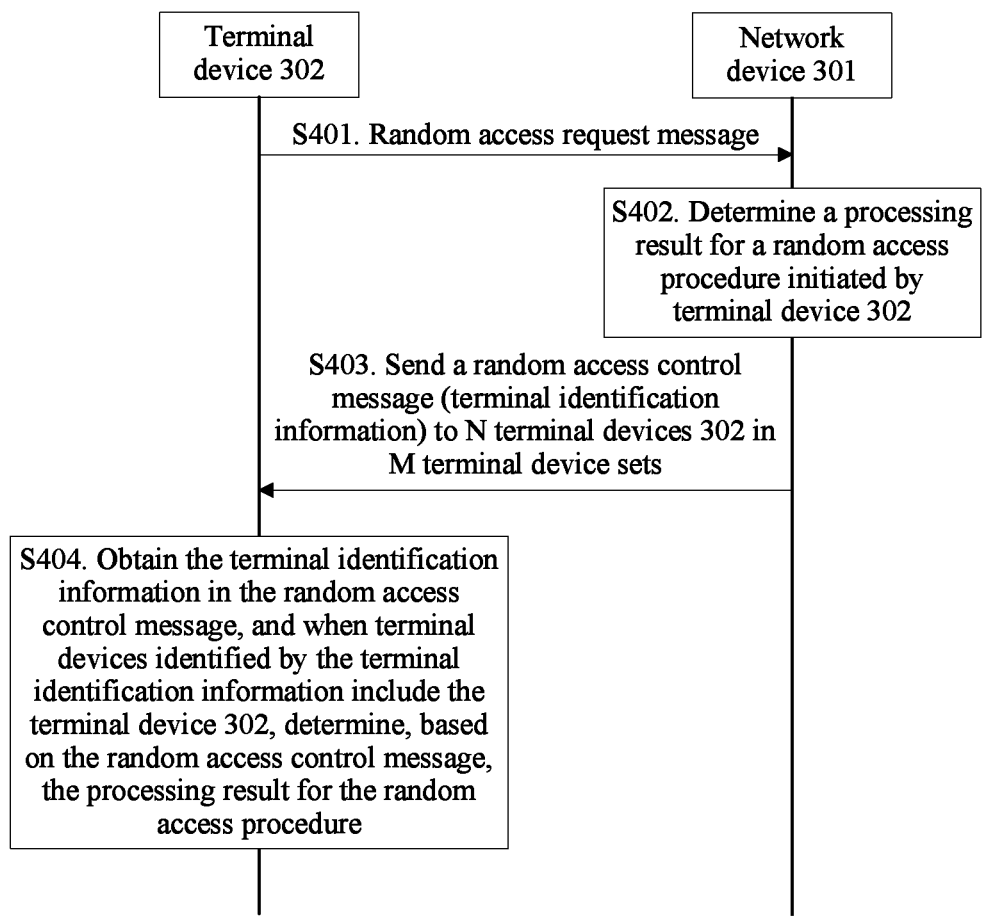
FIG. 4 is a flowchart of an interaction between a network device and terminal device in accordance with this application.

FIG. 4 shows a flowchart of an interaction between the network device 301 and the terminal device 302. As shown in FIG. 4, this process includes the following steps.

S401. Terminal device 302 may send a random access request message to a network device 301, to request access to a wireless communications system.

There may be a plurality of terminal devices 302 that send random access request messages to the network device 301 within a period of time.

S402. After receiving random access request messages sent by terminal devices 302, the network device 301 may determine a processing result for random access procedures initiated by the terminal devices 302.

Generally, the terminal devices 302 do not initiate the random access procedures exactly at a same time. Therefore, after receiving a random access request message sent by one terminal device 302, the network device 301 may immediately determine a processing result for the terminal device 302, and may not need to wait until all the random access request messages sent by the terminal devices 302 are received and then determine the processing result for the random access procedures initiated by the terminal devices 302.

Herein, the network device 301 may determine a same processing result for random access procedures initiated by N terminal devices 302 in M terminal device sets.

S403. The network device 301 may send a same random access control message to N terminal devices 302 in M terminal device sets, where the message may carry terminal set identification information that identifies the N terminal devices 302.

The network device 301 may, after determining a processing result for a random access procedure initiated by one terminal device 302, wait for, within a period of time, random access request messages sent by other terminal devices 302, and may determine a processing result for random access procedures initiated by the other terminal devices 302, and then may indicate, using the same random access control message, the same processing result for the random access procedures initiated by the terminal devices 302.

S404. After receiving the random access control message, the terminal device 302 may obtain the terminal set identification information from the message, and when terminal devices identified by the terminal set identification information include the terminal device 302, the terminal device 302 may determine, based on the random access control message, the processing result for a random access procedure initiated by the terminal device 302.

Optionally, if the terminal devices identified by the terminal set identification information do not include terminal set identification information of the terminal device 302, the terminal device 302 may ignore the random access control message and do not perform further processing.

In step S402, the network device 301 may determine the same processing result for the random access procedures initiated by the N terminal devices 302 in the M terminal device sets.

The following separately describes, based on different values of M, solutions that the network device 301 may use for sending the random access control message and that the terminal device 302 may use for receiving the random access control message in step S403.

1. M≥2

As previously described, M≥2 means that the network device 301 may send a same random access control message to a plurality of terminal devices 302 in a plurality of terminal device sets.

Based on a resource location that is in a downlink control channel and that is occupied by the random access control message, further, there may be the following two possible cases.

Case 1

The same random access control message may be sent in a same resource location that is in a downlink control channel and that corresponds to the M terminal device sets. In this way, downlink control channel resources may be greatly saved.

Accordingly, the terminal device 302 may receive the random access control message in the same resource location that is in the downlink control channel and that corresponds to the M terminal device sets.

Optionally, before the network device 301 sends the same random access control message to the N terminal devices 302, the network device 301 may broadcast channel resource location information, where the channel resource location information may indicate the same resource location in the downlink control channel.

Accordingly, the terminal device 302 may receive the channel resource location information broadcast by the network device 301, and may determine, based on the channel resource location information, the same resource location, in the downlink control channel, in which the random access control message is sent.

Case 2

The same random access control message may be separately sent in different resource locations that are in a downlink control channel and that correspond to the M terminal device sets. For example, the same random access control message may be sent in M different resource locations that are in the downlink control channel and that correspond to the M terminal device sets.

Optionally, before the network device 301 sends the same random access control message to the N terminal devices 302, the network device 301 may broadcast channel resource location information, where the channel resource location information may indicate resource locations, occupied for sending the random access control message, that are in the downlink control channel and that are separately corresponding to the M terminal device sets.

Accordingly, the terminal device 302 may receive the channel resource location information broadcast by the network device 301, and may determine, based on the channel resource location information and a terminal device set to which the terminal device 302 belongs, a resource, in the downlink control channel, that may be occupied by the random access control message sent to the terminal device set to which the terminal device 302 belongs.

In Case 2, the terminal devices 302 belonging to different terminal device sets may receive the random access control message in different resource locations in the downlink control channel, thereby implementing differentiated processing for different terminal device sets.

The following uses an example in which terminal devices 302 in different coverage classes belong to different terminal device sets. When being in a different coverage class, the terminal device 302 may have a different capability in receiving a signal transmitted by the network device 301. Therefore, when a solution in Case 2 is used, different downlink control channel resources may be allocated to the terminal devices 302 in different coverage classes. For example, downlink control channel resources with a relatively high anti-interference capability may be allocated to terminal devices 302 with relatively poor coverage. For example, these resources may use a low-order modulation manner and a robust channel encoding manner. For example, a larger quantity of repetition times may be used for these channels, to improve signal reception quality of these terminal devices 302.

2. M=1

M=1 means that the network device 301 may send a same random access control message to one or more terminal devices 302 in one terminal device set.

Optionally, the network device 301 may send the random access control message in a resource location that corresponds to a same terminal device set to which the N terminal devices 302 belong and that is in a downlink control channel.

Accordingly, the terminal device 302 may receive the random access control message in the resource location that corresponds to the terminal device set to which the terminal device 302 belongs and that is in the downlink control channel.

Optionally, before the network device 301 sends the same random access control message to the N terminal devices 302, the network device 301 may broadcast channel resource location information, where the channel resource location information indicates the resource location that corresponds to the same terminal device set and that is in the downlink control channel.

Accordingly, the terminal device 302 may receive the channel resource location information broadcast by the network device 301, and may determine, based on the channel resource location information, the resource location that corresponds to the terminal device set to which the terminal device 302 belongs.

M=1 may be considered as Case 2 in M≥2. That is, for different terminal device sets, the network device 301 may occupy different downlink control channel resources when sending the same random access control message.

In step S403, for an example in which the network device 301 may send the random access control message in different resource locations in the downlink control channel, refer to Example 1 in the following description.

In step S403 and step S404, the terminal set identification information in the random access control message may include one or more of the following information.

1. Type Information

The type information may indicate a same terminal device type to which the N terminal devices 302 belong.

In this manner, the network device 301 may notify, using a same random access control message, a plurality of terminal devices 302 that belong to a same terminal device type, of a processing result for random access procedures initiated by the plurality of terminal devices 302.

When the type information is used with region information, random access control may be performed on a plurality of terminal devices 302 that are of a specified terminal device type and that are in a same random access resource region in which random access resources are located.

For example, in a same random access resource region, terminal devices 302 that may initiate random access are of a plurality of types, for example, an emergency reporting terminal device type and a non-emergency reporting terminal device type. In some cases, the network device 301 may need to reject only terminal device 302 that is of the non-emergency reporting terminal device type. In such a case, the type information may indicate that a random access control message is only for terminal device 302 that is of the non-emergency reporting terminal device type.

The type information may include one or more items of information, for example, an information element (IE) "special UE indication (SpecialUE indication)" in Table 2 and Table 4 in Example 2, where the information element "special UE indication" may indicate the emergency reporting terminal device type and the non-emergency reporting terminal device type, and for another example, an IE "application indicator (application indicator)" in Table 2 and Table 4, where this IE may indicate an application group to which terminal device 302 belongs, and four bits may indicate 16 application groups.

2. Region Information

The region information may indicate a same random access resource region in which random access resources used by the N terminal devices 302 in the initiated random access procedures may be located.

In this manner, the network device 301 may notify, using a same random access control message, a plurality of terminal devices 302 that may be located in a same random access resource region, of a processing result for random access procedures initiated by the plurality of terminal devices 302.

The region information may include a random access resource frame number and intra-frame location information.

The random access resource frame number indicate a frame number of a random access resource frame in which the same random access resource region is located, for example, an IE "PRACH frame" in Table 1 to Table 4 in Example 2.

The intra-frame location information may indicate a location of the same random access resource region in the frame indicated by the random access resource frame number, for example, an IE "PRACH location indication (PRACH location indication)" in Table 2 and Table 4 in Example 2.

The intra-frame location information may be implemented in one of the following manners.

Manner 1

The intra-frame location information may include frequency domain starting location information, frequency domain ending location information, time domain starting location information, and time domain ending location information.

Manner 2

The intra-frame location information may include frequency domain starting location information, a frequency domain bandwidth, time domain starting location information, and time domain duration.

Manner 3

The intra-frame location information may include time domain location information, where the same random access resource region may occupy, in frequency domain, an entire bandwidth occupied by a random access channel, and may occupy, in time domain, one or more time units indicated by the time domain location information.

Manner 4

The intra-frame location information may include frequency domain location information, where the same random access resource region may occupy, in frequency domain, one or more frequency domain units indicated by the frequency domain location information, and may occupy, in time domain, an entire time period occupied by a random access channel.

Manner 5

The intra-frame location information may include one or more random access channel resource indexes, where each random access channel resource index may indicate a random access channel resource used by terminal device 302 to send a random access request message.

If the intra-frame location information is implemented in Manner 5, before step S403, the network device 301 may broadcast a correspondence between a random access channel resource index and a random access channel resource; or a correspondence between a random access channel resource index and a random access channel resource is pre-stipulated in a protocol.

For an example of the random access control message, refer to Example 3 in the following description.

In addition, different processing results for different terminal device groups may also be indicated in a same random access control message. Herein, each of the different terminal device groups includes one or more terminal devices, that is, the foregoing N terminal devices. However, for different groups, N may be different. For an example, refer to Example 4 in the following description.

Example 1

In Example 1, the random access control message sent by the network device 301 may be a random access reject message, a downlink control channel occupied by the network device 301 for sending the random access reject message may be a PDCCH, and terminal devices in different terminal device sets may belong to different coverage classes.

Figure 5:
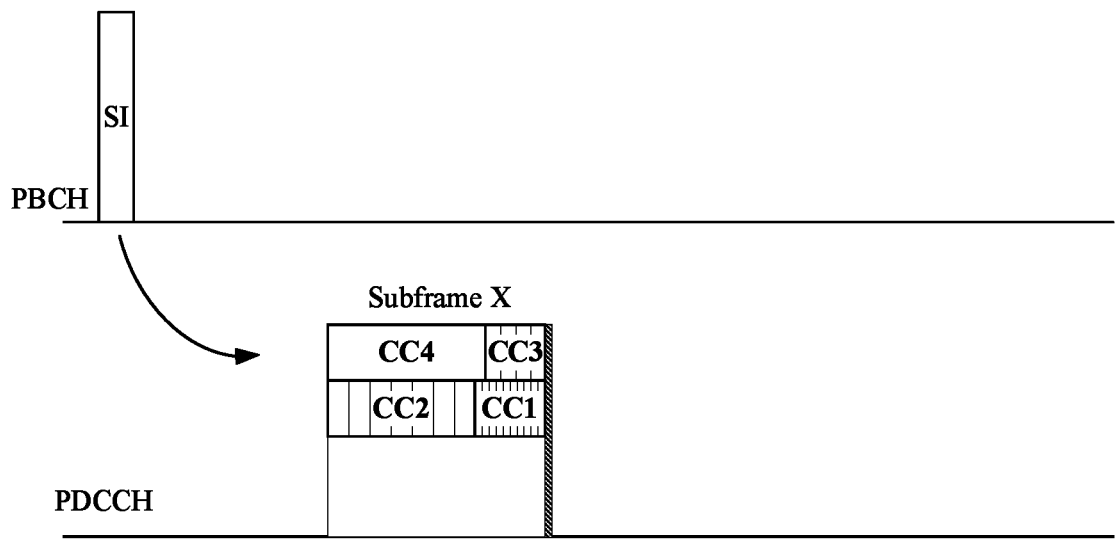
FIG. 5 is a schematic diagram of a PDCCH resource occupied by a network device for sending a random access reject message in accordance with Example 1 of this application.

FIG. 5 is a schematic diagram of a PDCCH resource occupied by the network device 301 for sending the random access reject message as described in Example 1.

As shown in FIG. 5, the network device 301 may configure a common PDCCH resource for each coverage class. The common PDCCH resource may be used for sending the random access reject message to terminal device 302 that is in a corresponding coverage class.

For example, the network device 301 may configure some locations in a PDCCH resource block of each coverage class as a common PDCCH resource of the coverage class, and may indicate the configured PDCCH resource in system information.

For example, the network device 301 may use an offset information element in the system information (SI) to indicate which first time slots in a PDCCH resource of each coverage class are a common PDCCH resource of the coverage class.

The system information may be sent on a physical broadcast channel (Physical Broadcast Channel, PBCH). In FIG.

5, CC (Coverage Class) may represent a coverage class, and different numbers may represent different coverage classes. In a PDCCH resource, resources marked by CC1 to CC4 may be common PDCCH resources that may be configured by the network device 301 for a coverage class 1 to a coverage class 4, respectively.

Example 2

In Example 2, an M2M system may be used as an example to describe a random access response message.

A format of a random access response message in a current M2M system may be shown in Table 1.

TABLE 1

Example of an uplink access response message in the current M2M system

| Information element (IE) | Size (bits) | Purpose |
|---|---|---|
| Message ID | 5 | Used to identify a message (Identifies message). |
| Mobile station access identifier (MS access identifier) | 12 | A random number in a channel request (Random number in the channel request) |
| Cell radio network temporary identifier (C-RNTI) | 20 | CellRadioNetworkTemporaryIdentifier--a cell radio network temporary identifier, used by a base station to uniquely identify UE under an air interface of a cell. |
| PUSCH subcarrier (PUSCH subcarrier) | 6 | |
| PUSCH starting location | 8 | A starting location of an uplink resource that starts from an ending location of a PDCCH, with a granularity of 10 ms and eight bits allowing for a maximum of 2.56 s (Starting location of the uplink resource from the end of the PDCCH with a granularity of 10 ms, 8 bits allow for 2.56 s) |
| PUSCH modulation and coding scheme (PUSCH MCS) | 4 | Modulation and coding scheme index (MCS index) |
| PUSCH (PUSCH CBS) | 5 | Code block size index (CBS index) |
| Transmit state variable VR | 1 | A value of a transmit state variable of a MAC PDU to be expected to be received by a base station (V(R) value of the MAC PDU to be expected to be received by a BS) |
| Total bits (Total) | 49, 61, or 69 | |

A format of a random access response message in an M2M system that may be used as an example in this application may be shown in Table 2.

Figure 6:
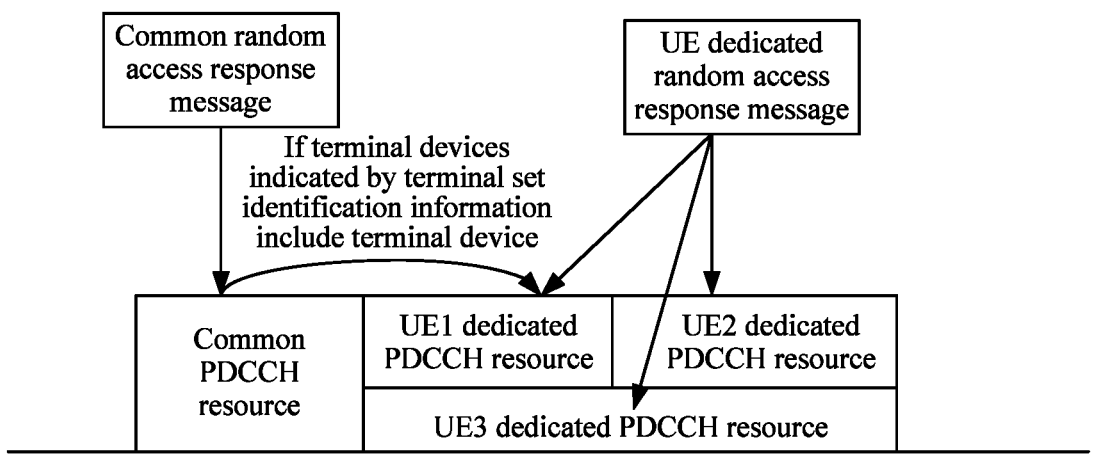
FIG. 6 is a schematic diagram of segmented indication used by random access response messages in accordance with Example 2 of this application.

As shown in FIG. 6, in this application, random access response messages may use a method of segmented indication. First, a common random access response message may be used to indicate a response to random access procedures initiated by terminal devices. Then, a terminal device dedicated random access response message may be used to indicate information such as an uplink resource that may be used by a terminal device for sending a Message3 (Msg3). For example, in FIG. 6, a common random access response message may be sent on a common PDCCH resource, indicating that a plurality of UEs including UE1, UE2, and UE3 may perform random access. Then, an uplink resource that may be used for sending an Msg3 may be separately indicated to UE1, UE2, and UE3 using a UE dedicated PDCCH resource. If terminal devices indicated by terminal set identification information in the random access response message received on the common PDCCH resource do not

TABLE 2

Example of an uplink access response message
on a common channel in this application

| Information element (IE) | Size (bits) | Purpose |
|---|---|---|
| Message ID | 5 | Used to identify a message (Identifies message). |
| PRACH frame | 2 | A frame relative to a PDCCH: 00 represents a current frame, 01 represents a previous frame, 10 represents a frame existing before latest two frames, and 11 represents a reserved item (Frame relative to PDCCH: 00 = current, 01 = previous, 10 = 2 frames ago, 11 = RFU) |
| PRACH location indication | 10 | Used to indicate a location of a random access resource in a PRACH frame. |
| UE type indication (SpecialUE indication) | 3 | |
| Total bits (Total) | 20 | | include terminal device, the terminal device may not need to read a dedicated random access response message. This may reduce a processing load on the terminal device.

A benefit of this design is as follows: The terminal device may read the following dedicated random access response message only after determining, based on the common random access response message, that a random access procedure initiated by the terminal device is responded, thereby potentially reducing the processing load on the terminal device.

A format of a random access reject message in the current M2M system may be shown in Table 3.

TABLE 3

Example of an uplink access reject message

| Information element (IE) | Size (bits) | Purpose |
| --- | --- | --- |
| Message ID | 5 | |
| Mobile station access identifier (MS access identifier) | 12/20 | A random identifier or a cell radio network temporary identifier (Random Id/C-RNTI) |
| PRACH frame | 2 | A frame relative to a PDCCH: 00 represents a current frame, 01 represents a previous frame, 10 represents a frame existing before latest two frames, and 11 represents a reserved item (Frame relative to PDCCH: - 00 = current, 01 = previous, 10 = 2 frames ago, 11 = RFU) |
| PRACH starting location | 5 | A location of an RACK in a frame, 0-31 ms and 40 ms time slots (RACH location in frame 0-31 and 40 ms slot) |
| Wait time | 5 | Wait duration before a mobile station may make another attempt to access, in a unit of frames (Duration in number of frames before MS can make another attempt to access) |
| Total bits (Total) | 29 or 37 | |

The Message ID may indicate a type of a message, and may indicate that the message is a random access reject message.

The MS access identifier may indicate an identifier (UE ID) of terminal device that is rejected from access.

The physical random access channel (PRACH) frame may indicate a frame number of an RACH resource frame occupied by a rejected random access request message.

The PRACH starting location may indicate a starting location of a PRACH resource in a PRACH frame.

The wait time may indicate a minimum time that the terminal device needs to wait for before initiating random access.

A format of a random access reject message in the M2M system that is used as an example in this application may be shown in Table 4.

TABLE 4

Example of an uplink access reject message in this application

| Information element (IE) | Size (bits) | Purpose |
| --- | --- | --- |
| Message ID (Message ID) | 5 | |
| PRACH frame | 2 | A frame relative to a PDCCH: 00 represents a current frame, 01 represents a previous frame, 10 represents a frame existing before latest two frames, and 11 represents a reserved item (Frame relative to PDCCH: - 00 = current, 01 = previous, 10 = 2 frames ago, 11 = RFU) |
| PRACH location indication | 10 | Used to indicate a location of a random access resource in a PRACH frame. |
| UE type indication (SpecialUE indication) | 3 | |
| Wait time | 5 | Wait duration before a mobile station may make another attempt to access, in a unit of frames or subframes (Duration in number of frames or subframe before MS can make another attempt to access) |
| Total bits (Total) | 25 | |

Figure 7:
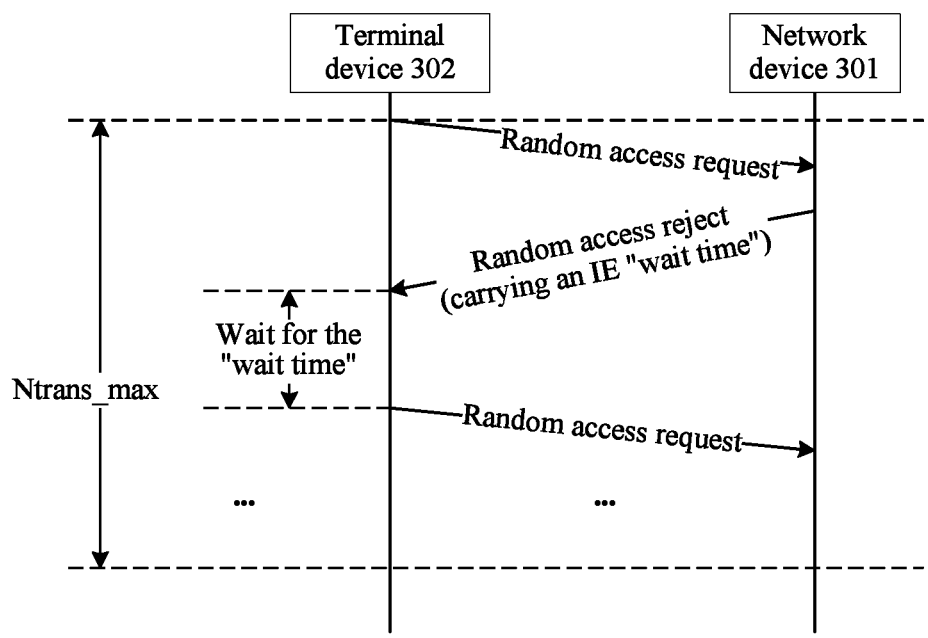
FIG. 7 is a schematic diagram of an information element "wait time" in accordance with Example 2 of this application.

FIG. 7 shows an illustration of the IE "wait time" described in Table 3 and Table 4. The terminal device 302 may send a random access request message to the network device 301 and may initiate a random access procedure. The network device 301 may send a random access reject message to the terminal device 302, and the message may carry the IE "wait time". After receiving the random access reject message, the terminal device 302 may wait based on a "wait time" in the message. After the wait time expires, the terminal device 302 may re-send a random access request message to the network device 301. Ntrans_max in FIG. 7 may indicate a quantity of times that the terminal device 302 may send a random access request message. Currently, a maximum quantity of times of sending a random access request message may be indicated in the system information, and may not need to be indicated in a response message, but may be used as a candidate IE.

The following example embodiment uses an example in which the intra-frame location information as implemented in Manner 5. The intra-frame location information may include one or more random access channel resource indexes, where each random access channel resource index may indicate a random access channel resource used by terminal device 302 to send a random access request message.

Figure 8:
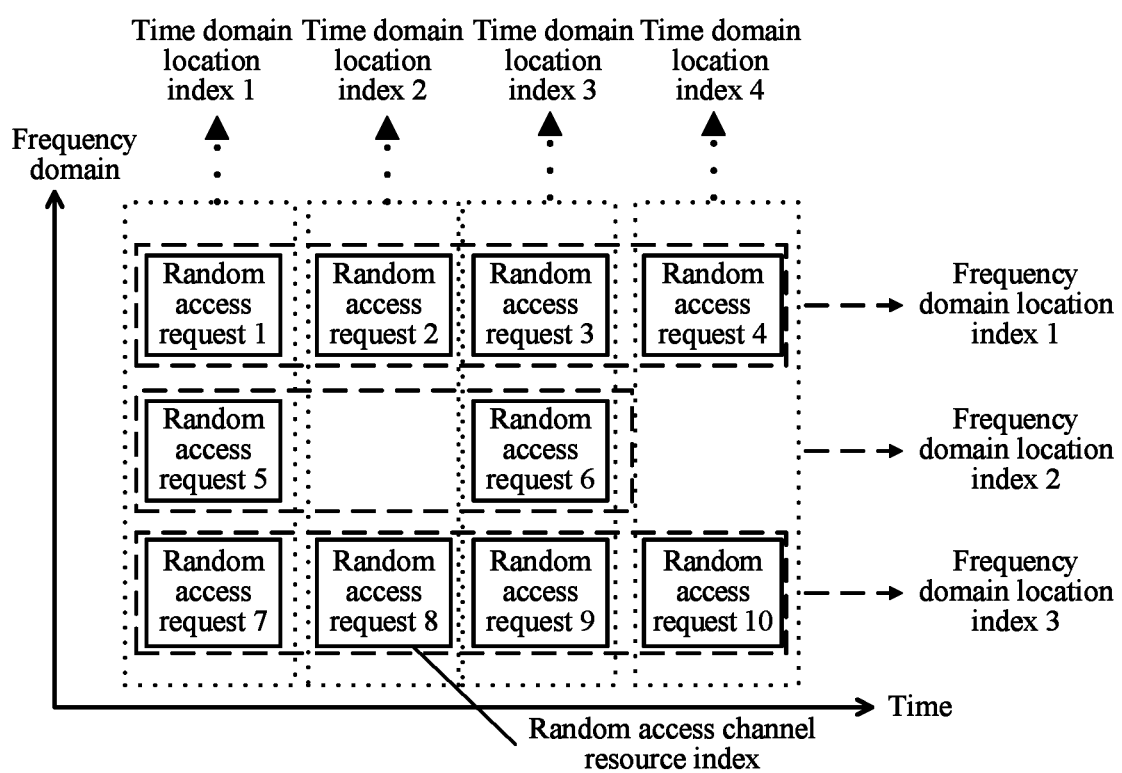
FIG. 8 is a schematic diagram of region information in accordance with Example 2 of this application.

Referring to FIG. 8, random access request 1 to random access request 10 may indicate ten (10) random access channel resource indexes. It is assumed that FIG. 8 shows random access resources (RACH resources) in a frame. A random access channel resource index value may increase successively from left to right and from top to bottom.

For example, if the network device 301 wants to reject random access requests sent on random access resources with random access channel resource indexes being 1 and 2 in a PRACH frame, it may be set, in a random access reject message, with a PRACH location indication that includes the random access request 1 and the random access request 2.

For another example, in Manner 5 in which the intra-frame location information may be implemented, the intra-frame location information may include two IEs: a PRACH starting location indication and a duration. If the network device 301 wants to reject all random access procedures initiated within a segment of time-frequency resources, it may be implemented by setting these two IEs. For example, the PRACH starting location indication may be set to "1", indicating that a starting location of random access resources occupied by rejected random access procedures is a random access resource indicated by a first index in the frame, and the duration may be set to "3", indicating that random access procedures initiated on three consecutive random access resources starting from the starting location are rejected.

If the network device 301 wants to reject random access procedures initiated by all terminal devices 302 within a period of time in a PRACH frame, Manner 3 in which the intra-frame location information is implemented may be used. When a starting timeslot number and an ending timeslot number in the frame are specified, it may indicate that random access procedures initiated on all random access resources on an entire bandwidth occupied by a PRACH within the time range are rejected. Alternatively, Manner 3 may still be used, and a correspondence between a time domain location index and a time domain location occupied by a random access resource may be pre-defined. As shown in FIG. 8, when the intra-frame location information is set to include time domain location indexes 1 to 3, it may indicate that all random access procedures initiated within the period of time in the PRACH frame are rejected.

If the network device 301 wants to reject random access procedures initiated by all terminal devices 302 within a segment of frequency domain resources in a PRACH frame, Manner 4 in which the intra-frame location information is implemented may be used. When a starting frequency domain location and an ending frequency domain location in the frame are specified, it may indicate that random access procedures initiated on all random access resources within the frequency domain range within an entire time period during which the PRACH frame persists are rejected. Alternatively, Manner 4 may still be used, and a correspondence between a frequency domain location index and a frequency domain location occupied by a random access resource is pre-defined. As shown in FIG. 8, when the intra-frame location information is set to include frequency domain location indexes 1 and 3, it may indicate that random access procedures initiated on all random access resources within the two frequency domain ranges within an entire time period during which the PRACH frame persists are rejected.

If the network device 301 wants to reject random access procedures initiated by all terminal devices 302 within a specified period of time within a segment of frequency domain resources in a PRACH frame, Manner 1 or Manner 2 in which the intra-frame location information is implemented may be used. Manner 1 is used as an example. The intra-frame location information may include four IEs, namely, a PRACH frequency domain starting location indication, a PRACH frequency domain ending location indication, a PRACH time domain starting location indication, and a PRACH time domain ending location indication.

Referring to FIG. 8, if the PRACH frequency domain starting location indication is "1", the PRACH frequency domain ending location indication is "2", the PRACH time domain starting location indication is "2", and the PRACH time domain ending location indication is "4", it may indicate that all random access procedures initiated on random access resources that are in top two rows and in three columns on the right in FIG. 8 are rejected.

After Table 1 and Table 2 are compared and Table 3 and Table 4 are compared, it can be learned that in Example 2, a random access control message that is previously sent on a terminal device dedicated downlink control channel is changed to be sent on a common downlink control channel, for a message format, the IE "mobile station access identifier" may be deleted, the IE "special UE indication" may be added, and with reference to the PRACH location indication, random access procedures initiated by UEs of a specific type on some random access resources may be rejected.

The random access control message may be improved. That is, the mobile station access identifier may be deleted, thereby reducing a message length and reducing signaling overheads.

Example 3

Figure 9:
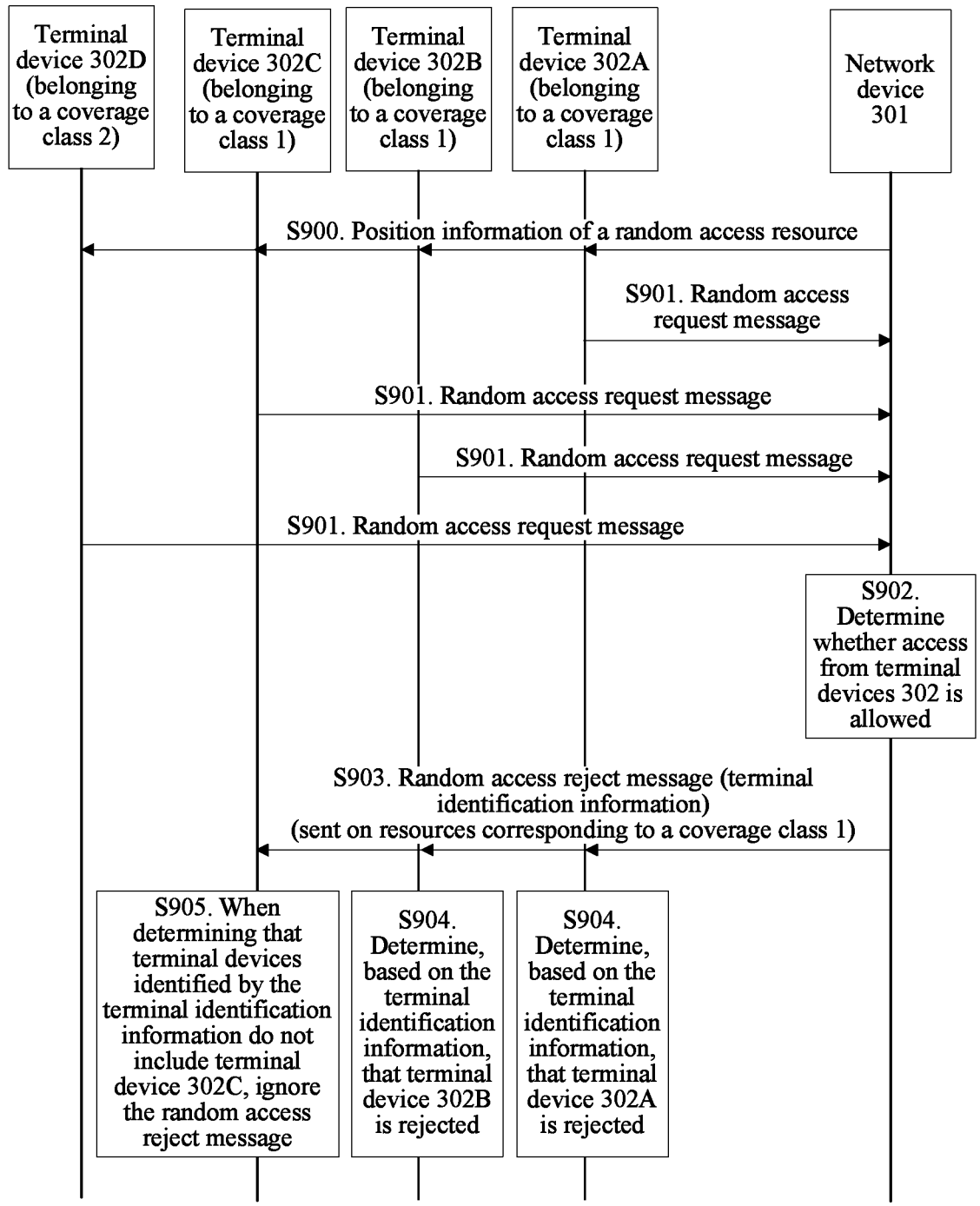
FIG. 9 is a flowchart of a random access procedure in accordance with Example 3 in this application.

In Example 3, a random access reject message is used as an example, to describe a processing process of the terminal devices 302 and the network device 301 in a random access procedure. As shown in FIG. 9, this process may include the following steps.

S900. The network device 301 may send system information to each terminal device 302 (herein, terminal device 302A to terminal device 302D are included, and other terminal devices 302 may be further included), to indicate locations of random access resources. The terminal devices 302 may read the system information sent by a base station, to obtain the locations of the random access resources.

The terminal device 302A to terminal device 302C may belong to the coverage class 1, and the terminal device 302D may belong to the coverage class 2.

S901. The terminal device 302A to the terminal device 302D may separately select a random access resource and may send a random access request message.

S902. After receiving the random access request message sent by each terminal device 302, the network device 301 may determine, based on a system congestion status, to reject random access procedures initiated on some random access resources by terminal devices 302 that belong to the coverage class 1 and that are of the non-emergency reporting terminal device type.

S903. The network device 301 may send a random access reject message on a resource that corresponds to the coverage class 1 and that is in a PDCCH, and may use the IE "special UE indication" in Table 4 to indicate rejection of random access procedures initiated by terminal devices 302 that are of the non-emergency reporting terminal device type, and may use the IE "PRACH location indication" in Table 4 to indicate rejection of random access procedures initiated on some random access resources.

The terminal device 302A to the terminal device 302C may receive the random access reject message sent by the network device 301 on the resource that corresponds to the coverage class 1 and that is in the PDCCH.

S904. Terminal device 302B and the terminal device 302A may determine, based on terminal set identification information, that random access procedures initiated by the terminal device 302B and the terminal device 302A are rejected.

S905. The terminal device 302C may be of the emergency reporting terminal device type. Therefore, random access resources indicated in the terminal set identification information may not include a random access resource occupied by the terminal device 302C to send the random access request message, and the terminal device 302C may ignore the random access reject message.

The rejected terminal devices 302 may wait for a "wait time" and then may initiate a random access procedure.

In Example 1, the network device 301 may send the random access reject message to a group on the common PDCCH, to reject access initiated on some random access resources by terminal devices 302 of a specific type. That is, batch rejection may save PDCCH resources.

Example 4

It is assumed that processing results for random access procedures from P terminal device groups may indicated in a same random access control message, where P is a positive integer. There may be P pieces of indication information, and each piece of indication information corresponds to one terminal device group. The indication information may indicate whether random access procedures initiated by all terminal devices 302 in a corresponding terminal device group may be responded or rejected. The indication information may include one bit. When a value of the bit is "0", it may indicate that random access procedures initiated by all terminal devices 302 in a corresponding terminal device group may be responded. When a value of the bit is "1", it may indicate that random access procedures initiated by all terminal devices 302 in a corresponding terminal device group may be rejected.

Further, optionally, the P pieces of indication information may form a bitmap. Each bit in the bitmap may correspond to one foregoing random access resource region. P bits in the bitmap may correspond to P random access resource regions. When a bit in the bitmap is set to "0", it may indicate that all random access procedures from a corresponding random access resource region may be responded. When a bit in the bitmap is set to "1", it may indicate that all random access procedures from a corresponding random access resource region may be rejected.

Figure 10:
FIG. 10 is a schematic structural diagram of a first network device provided in this application.

FIG. 10 is a schematic structural diagram of a first network device provided in this application. As shown in FIG. 10, the network device may include: a processing module low, configured to determine a same processing result for random access procedures initiated by N terminal devices in M terminal device sets, where M and N are positive integers; and a sending module 1002, configured to send a same random access control message to the N terminal devices that initiate the random access procedures, where the random access control message may indicate the same processing result determined by the processing module 1001, the message may include terminal set identification information, and the terminal set identification information may identify the N terminal devices.

Optionally, the sending module 1002 may be configured to, when M≥2, send the random access control message in a same resource location that is in a downlink control channel and that corresponds to the M terminal device sets.

Optionally, the sending module 1002 may be further configured to, before sending the same random access control message to the N terminal devices, broadcast channel resource location information, where the channel resource location information is used to indicate the same resource location.

Optionally, the sending module 1002 may be configured to, when M=1, send the random access control message in a resource location that corresponds to a same terminal device set to which the N terminal devices belong and that is in a downlink control channel.

Optionally, the sending module 1002 may be further configured to, before sending the same random access control message to the N terminal devices, broadcast channel resource location information, where the channel resource location information may indicate the same resource location that corresponds to the same terminal device set and that is in the downlink control channel.

Optionally, all terminal devices in each terminal device set may have at least one of the following characteristics: belonging to a same coverage class; device identifiers belonging to a same device identifier set; or belonging to a same priority set.

Optionally, the terminal set identification information may include one or more of the following information: type information, where the type information may indicate a same terminal device type to which the N terminal devices belong; and region information, where the region information may indicate a same random access resource region in which random access resources used by the N terminal devices in the initiated random access procedures are located.

Optionally, the region information may include a random access resource frame number and intra-frame location information; the random access resource frame number may indicate a frame number of a random access resource frame in which the same random access resource region is located; the intra-frame location information may indicate a location of the same random access resource region in the frame indicated by the random access resource frame number; and the intra-frame location information may include frequency domain starting location information, frequency domain ending location information, time domain starting location information, and time domain ending location information; or the intra-frame location information may include frequency domain starting location information, a frequency domain bandwidth, time domain starting location information, and time domain duration; or the intra-frame location information may include time domain location information, where the same random access resource region may occupy, in frequency domain, an entire bandwidth occupied by a random access channel, and may occupy, in time domain, one or more time units indicated by the time domain location information; or the intra-frame location information may include frequency domain location information, where the same random access resource region may occupy, in frequency domain, one or more frequency domain units indicated by the frequency domain location information, and may occupy, in time domain, an entire time period occupied by a random access channel; or the intra-frame location information may include one or more random access channel resource indexes, where each random access channel resource index may indicate a random access channel resource used by a terminal device to send a random access request message.

Optionally, the sending module 1002 may be further configured to: when the intra-frame location information includes one or more random access channel resource indexes, where each random access channel resource index may indicate a random access channel resource used by terminal device to send a random access request message, and before the network device sends the random access control message, broadcast a correspondence between a random access channel resource index and a random access channel resource; or a correspondence between a random access channel resource index and a random access channel resource may be pre-stipulated in a protocol.

For a possible implementation of the network device shown in FIG. 10, refer to the foregoing network device 301. The processing module 1001 is configured to perform a processing operation performed by the network device 301, and the sending module 1002 is configured to perform a sending operation performed by the network device 301.

A communications standard used by a wireless communications system in which the network device shown in FIG. 10 is located may be the communications standard used by the wireless communications system shown in FIG. 3. Other possible implementation forms of the network device, for example, a base station and a radio resource management device, may also be various implementation forms of the network device 301.

For a process in which the network device shown in FIG. 10 interacts with terminal device in a wireless communications system, refer to the process shown in FIG. 4.

For a resource location that is in a downlink control channel and that is occupied when the network device shown in FIG. 10 sends the random access control message, refer to Case 1 and Case 2 of the foregoing resource location.

For an optional implementation of the terminal set identification information sent by the network device shown in FIG. 10, refer to descriptions about the terminal set identification information in step S403 and step S404 in the process shown in FIG. 4.

In the network device shown in FIG. 10, the processing module 1001 may be implemented by a processor, and the sending module 1002 may be implemented by a transmitter.

A signal transmitted by the sending module 1002 may be transmitted by one or more antennas.

For a format of a message sent by the network device shown in FIG. 10, an implementation of an occupied downlink control channel resource, and a process, refer to descriptions about the network device 301 in the foregoing Example 1, Example 2, Example 3, and Example 4.

Figure 14:
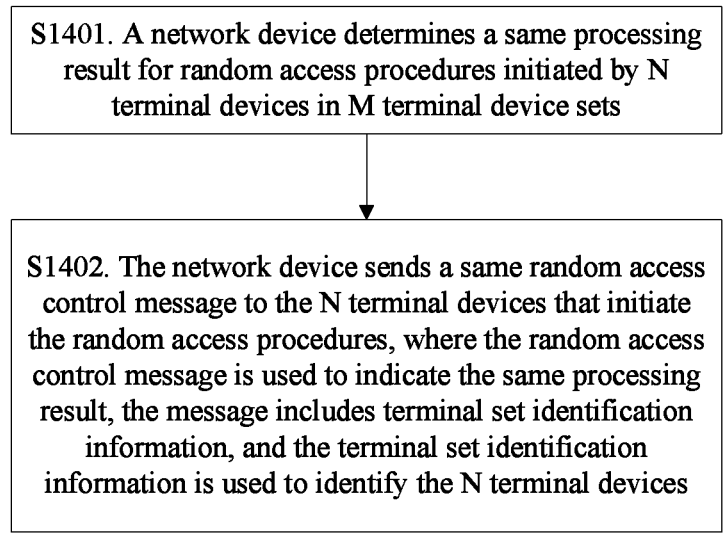
FIG. 14 is a flowchart of a first random access method provided in this application.

The network device shown in FIG. 10 may be configured to perform a first random access method as shown in FIG. 14.

Figure 11:
FIG. 11 is a schematic structural diagram of a second network device provided in this application.

FIG. 11 is a schematic structural diagram of a second network device provided in this application. As shown in FIG. 11, the network device may include: a processor 1101, configured to determine a same processing result for random access procedures initiated by N terminal devices in M terminal device sets, where M and N are positive integers; and a transmitter 1102, configured to send a same random access control message to the N terminal devices that initiate the random access procedures, where the random access control message may indicate the same processing result determined by the processor 1101, the message may include terminal set identification information, and the terminal set identification information may identify the N terminal devices.

For various optional implementations of the processor 1101, refer to the processing module 1001. For various optional implementations of the transmitter 1102, refer to the sending module 1002.

For an example implementation of the network device shown in FIG. 11, refer to the foregoing network device 301. The processor 1101 may be configured to perform a processing operation performed by the network device 301, and the transmitter 1102 may be configured to perform a sending operation performed by the network device 301.

A communications standard used by a wireless communications system in which the network device shown in FIG. 11 is located may be the communications standard used by the wireless communications system shown in FIG. 3. Other possible implementation forms of the network device, for example, a base station and a radio resource management device, may also be various implementation forms of the network device 301.

For a process in which the network device shown in FIG. 11 interacts with terminal device in a wireless communications system, refer to the process shown in FIG. 4.

For a resource location that is in a downlink control channel and that may be occupied when the network device shown in FIG. 11 may send the random access control message, refer to Case 1 and Case 2 of the foregoing resource location.

For an optional implementation of the terminal set identification information sent by the network device shown in FIG. 11, refer to descriptions about the terminal set identification information in step S403 and step S404 in the process shown in FIG. 4.

For an exemplary format of a message sent by the network device shown in FIG. 11, an implementation of an occupied downlink control channel resource, and a process, refer to the descriptions about the network device 301 in the foregoing Example 1, Example 2, Example 3, and Example 4.

The network device shown in FIG. 11 may be configured to perform a first random access method as shown in FIG. 14.

Figure 12:
FIG. 12 is a schematic structural diagram of a first terminal device provided in this application.

FIG. 12 is a schematic structural diagram of a first terminal device provided in this application. As shown in FIG. 12, the terminal device may include: a receiving module 1201, configured to receive a random access control message that may be sent by a network device in response to a random access procedure initiated by the terminal device; and a processing module 1202, configured to: obtain terminal set identification information in the random access control message received by the receiving module 1201, where the terminal set identification information may identify N terminal devices in M terminal device sets, and M and N are positive integers; and when determining that the terminal set identification information includes an identifier of the terminal device, determine, based on the random access control message, a processing result that the network device determines for the random access procedure initiated by the terminal device.

Optionally, the receiving module 1201 may be configured to, when M≥2, receive the random access control message in a same resource location that is in a downlink control channel and that corresponds to the M terminal device sets.

Optionally, the receiving module 1201 may be further configured to, before receiving the random access control message, receive channel resource location information broadcast by the network device, where the channel resource location information may indicate the same resource location.

Optionally, the receiving module 1201 may be configured to, when M=1, receive the random access control message in a resource location that corresponds to a terminal device set to which the terminal device may belong and that is in a downlink control channel.

Optionally, the receiving module 1201 may be further configured to, before the terminal device receives the random access control message, receive channel resource location information broadcast by the network device, where the channel resource location information may indicate the resource location that corresponds to the terminal device set to which the terminal device may belong and that is in the downlink control channel.

Optionally, all terminal devices in each terminal device set may have at least one of the following characteristics: belonging to a same coverage class; device identifiers belonging to a same device identifier set; or belonging to a same priority set.

Optionally, the terminal set identification information may include one or more of the following information: type information, where the type information may indicate a terminal device type to which the terminal device belongs; and region information, where the region information may indicate a random access resource region in which a random access resource used by the terminal device in the initiated random access procedure may be located.

Optionally, the region information may include a random access resource frame number and intra-frame location information. The random access resource frame number may indicate a frame number of a random access resource frame in which the same random access resource region may be located. The intra-frame location information may indicate a location of the same random access resource region in the frame indicated by the random access resource frame number; and the intra-frame location information may include frequency domain starting location information, frequency domain ending location information, time domain starting location information, and time domain ending location information; or the intra-frame location information may include frequency domain starting location information, a frequency domain bandwidth, time domain starting location information, and time domain duration; or the intra-frame location information may include time domain location information, where the random access resource region may occupy, in frequency domain, an entire bandwidth occupied by a random access channel, and may occupy, in time domain, one or more time units indicated by the time domain location information; or the intra-frame location information may include frequency domain location information, where the random access resource region may occupy, in frequency domain, one or more frequency domain units indicated by the frequency domain location information, and may occupy, in time domain, an entire time period occupied by a random access channel; or the intra-frame location information may include one or more random access channel resource indexes, where each random access channel resource index may indicate a random access channel resource used by terminal device to send a random access request message.

Optionally, the receiving module 1201 may be further configured to: when the intra-frame location information includes one or more random access channel resource indexes, where each random access channel resource index may indicate a random access channel resource used by terminal device to send a random access request message, and before the terminal device receives a random access reject message, may receive a correspondence between a random access channel resource index and a random access channel resource, where the correspondence may be broadcast by the network device; or a correspondence between a random access channel resource index and a random access channel resource may be pre-stipulated in a protocol.

For a possible implementation of the terminal device shown in FIG. 12, refer to the foregoing terminal device 302. The processing module 1202 may be configured to perform a processing operation performed by the terminal device 302, and the receiving module 1201 may be configured to perform a receiving operation performed by the terminal device 302.

A communications standard used by a wireless communications system in which the terminal device shown in FIG. 12 is located may be the communications standard used by the wireless communications system shown in FIG. 3. Other implementation forms of the terminal device may also be various implementation forms of the terminal device 302.

For a process in which the terminal device shown in FIG. 12 interacts with a network device in a wireless communications system, refer to the process shown in FIG. 4.

For a resource location that is in a downlink control channel and that is used when the terminal device shown in FIG. 12 receives the random access control message, refer to Case 1 and Case 2 of the foregoing resource location.

For an optional implementation of the terminal set identification information received by the terminal device shown in FIG. 12, refer to descriptions about the terminal set identification information in step S403 and step S404 in the process shown in FIG. 4.

In the terminal device shown in FIG. 12, the processing module 1202 may be implemented by a processor, and the receiving module 1201 may be implemented by a receiver. The receiving module 1201 may receive a signal using one or more antennas.

For an exemplary format of a message received by the terminal device shown in FIG. 12, an implementation of a downlink control channel resource occupied by the received random access control message, and a process, refer to descriptions about the terminal device 302 in the foregoing Example 1, Example 2, Example 3, and Example 4.

Figure 15:
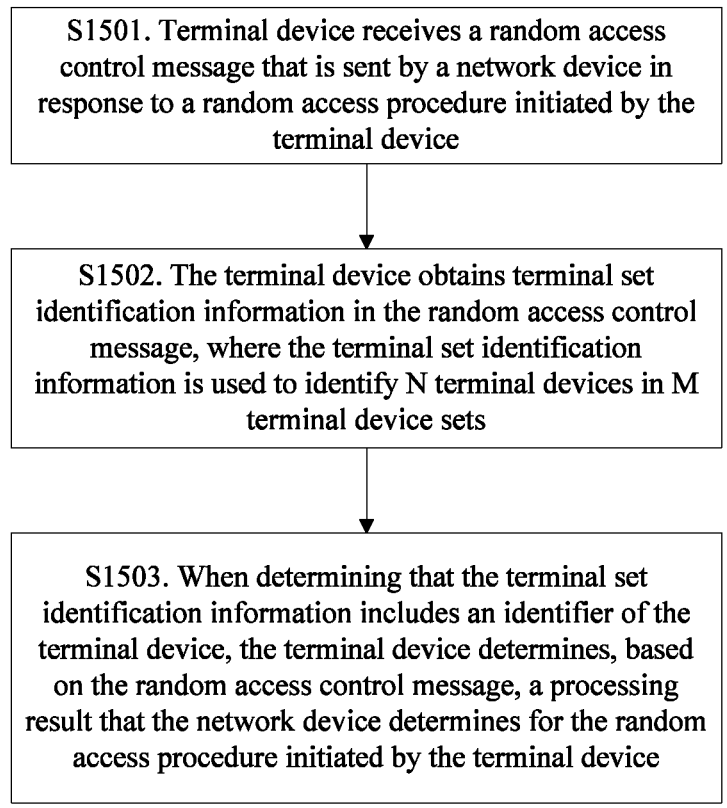
FIG. 15 is a flowchart of a second random access method provided in this application.

The terminal device shown in FIG. 12 may be configured to perform a second random access method as shown in FIG. 15.

Figure 13:
FIG. 13 is a schematic structural diagram of a second terminal device provided in this application.

FIG. 13 is a schematic structural diagram of a second terminal device provided in this application. As shown in FIG. 13, the terminal device may include: a receiver 1301, configured to receive a random access control message that may be sent by a network device in response to a random access procedure initiated by the terminal device; and a processor 1302, configured to: obtain terminal set identification information in the random access control message received by the receiver 1301, where the terminal set identification information may identify N terminal devices in M terminal device sets, and M and N are positive integers; and when determining that the terminal set identification information includes an identifier of the terminal device, determine, based on the random access control message, a processing result that the network device may have determined for the random access procedure initiated by the terminal device.

For specific implementation of the terminal device shown in FIG. 13, refer to the foregoing terminal device 302. The processor 1302 may be configured to perform a processing operation performed by the terminal device 302, and the receiver 1301 may be configured to perform a receiving operation performed by the terminal device 302.

A communications standard used by a wireless communications system in which the terminal device shown in FIG. 13 is located may be the communications standard used by the wireless communications system shown in FIG. 3. Other implementation forms of the terminal device may also be various implementation forms of the terminal device 302.

For a process in which the terminal device shown in FIG. 13 interacts with a network device in a wireless communications system, refer to the process shown in FIG. 4.

For a resource location that may be in a downlink control channel and that may be used when the terminal device as shown in FIG. 13 receives the random access control message, refer to Case 1 and Case 2 of the foregoing resource location.

For an optional implementation of the terminal set identification information received by the terminal device shown in FIG. 13, refer to descriptions about the terminal set identification information in step S403 and step S404 in the process shown in FIG. 4.

For a format of a message received by the terminal device shown in FIG. 13, an implementation of a downlink control channel resource occupied by the received random access control message, and a process, refer to descriptions about the terminal device 302 in the foregoing Example 1, Example 2, Example 3, and Example 4.

The terminal device shown in FIG. 13 may be configured to perform a second random access method shown in FIG. 15.

FIG. 14 is a flowchart of a first random access method provided in this application. As shown in FIG. 14, this process may include the following steps.

S1401. A network device may determine a same processing result for random access procedures initiated by N terminal devices in M terminal device sets, where M and N are positive integers.

S1402. The network device may send a same random access control message to the N terminal devices that initiate the random access procedures, where the random access control message may indicate the same processing result, the message may include terminal set identification information, and the terminal set identification information may identify the N terminal devices.

Optionally, when M≥2, the network device may send a same random access control message to the N terminal devices that initiate the random access procedures may include sending, by the network device, the random access control message in a same resource location that is in a downlink control channel and that corresponds to the M terminal device sets.

Optionally, before the network device sends the same random access control message to the N terminal devices, the method may further include broadcasting, by the network device, channel resource location information, where the channel resource location information may indicate the same resource location.

Optionally, when M=1, the network device may send a same random access control message to the N terminal devices may include sending, by the network device, the random access control message in a resource location that corresponds to a same terminal device set to which the N terminal devices belong and that is in a downlink control channel.

Optionally, before the network device sends the same random access control message to the N terminal devices, the method may further include broadcasting, by the network device, channel resource location information, where the channel resource location information may indicate the resource location that corresponds to the same terminal device set and that is in the downlink control channel.

Optionally, all terminal devices in each terminal device set may have at least one of the following characteristics: belonging to a same coverage class; device identifiers belonging to a same device identifier set; or belonging to a same priority set.

Optionally, the terminal set identification information may include one or more of the following information: type information, where the type information may indicate a same terminal device type to which the N terminal devices belong; and region information, where the region information may indicate a same random access resource region in which random access resources used by the N terminal devices in the initiated random access procedures are located.

Optionally, the region information may include a random access resource frame number and intra-frame location information. The random access resource frame number may indicate a frame number of a random access resource frame in which the same random access resource region is located. The intra-frame location information may indicate a location of the same random access resource region in the frame indicated by the random access resource frame number; and the intra-frame location information may include frequency domain starting location information, frequency domain ending location information, time domain starting location information, and time domain ending location information; or the intra-frame location information may include frequency domain starting location information, a frequency domain bandwidth, time domain starting location information, and time domain duration; or the intra-frame location information may include time domain location information, where the same random access resource region may occupy, in frequency domain, an entire bandwidth occupied by a random access channel, and may occupy, in time domain, one or more time units indicated by the time domain location information; or the intra-frame location information may include frequency domain location information, where the same random access resource region may occupy, in frequency domain, one or more frequency domain units indicated by the frequency domain location information, and may occupy, in time domain, an entire time period occupied by a random access channel; or the intra-frame location information may include one or more random access channel resource indexes, where each random access channel resource index may indicate a random access channel resource used by terminal device to send a random access request message.

Optionally, if the intra-frame location information includes one or more random access channel resource indexes, where each random access channel resource index may indicate a random access channel resource used by terminal device to send a random access request message, before the network device sends the random access control message, the method may further include: broadcasting, by the network device, a correspondence between a random access channel resource index and a random access channel resource; or a correspondence between a random access channel resource index and a random access channel resource may be pre-stipulated in a protocol.

For an implementation of the method shown in FIG. 14, refer to processing performed by the foregoing network device 301.

In the method shown in FIG. 14, a communications standard used by a wireless communications system in which the network device is located may be the communications standard used by the wireless communications system shown in FIG. 3. Several implementation forms of the network device, for example, a base station and a radio resource management device, may also be various implementation forms of the network device 301.

In the method shown in FIG. 14, for a process in which the network device may interact with a terminal device in a wireless communications system, refer to the process shown in FIG. 4.

In the method shown in FIG. 14, for the resource location that is in the downlink control channel and that is occupied when the network device sends the random access control message, refer to Case 1 and Case 2 of the foregoing resource location.

In the method shown in FIG. 14, for an optional implementation of the terminal set identification information, refer to descriptions about the terminal set identification information in step S403 and step S404 in the process shown in FIG. 4.

In the method shown in FIG. 14, for a possible format of a message sent by the network device, an implementation of an occupied downlink control channel resource, and a process, refer to descriptions about the network device 301 in the foregoing Example 1, Example 2, Example 3, and Example 4.

FIG. 15 is a flowchart of a second random access method provided in this application. As shown in FIG. 15, the method includes the following steps:

S1501. Terminal device may receive a random access control message that may be sent by a network device in response to a random access procedure initiated by the terminal device.

S1502. The terminal device may obtain terminal set identification information included in the random access control message, where the terminal set identification information may identify N terminal devices in M terminal device sets, and M and N are positive integers.

S1503. When determining that the terminal set identification information includes an identifier of the terminal device, the terminal device may determine, based on the random access control message, a processing result that the network device may have determined for the random access procedure initiated by the terminal device.

Optionally, when M≥2, that terminal device receiving a random access control message may include receiving, by the terminal device, the random access control message in a same resource location that is in a downlink control channel and that corresponds to the M terminal device sets.

Optionally, before the terminal device receives the random access control message, the method may further include receiving, by the terminal device, channel resource location information broadcast by the network device, where the channel resource location information may indicate the same resource location.

Optionally, when M=1, terminal device receiving a random access control message may include receiving, by the terminal device, the random access control message in a resource location that corresponds to a terminal device set to which the terminal device belongs and that is in a downlink control channel.

Optionally, before the terminal device receives the random access control message, the method may further include receiving, by the terminal device, channel resource location information broadcast by the network device, where the channel resource location information may indicate the resource location that corresponds to the terminal device set to which the terminal device belongs and that is in the downlink control channel.

Optionally, all terminal devices in each terminal device set may have at least one of the following characteristics: belonging to a same coverage class; device identifiers belonging to a same device identifier set; or belonging to a same priority set.

Optionally, the terminal set identification information may include one or more of the following information: type information, where the type information may indicate a terminal device type to which the terminal device belongs; and region information, where the region information may indicate a random access resource region in which a random access resource used by the terminal device in the initiated random access procedure is located.

Optionally, the region information may include a random access resource frame number and intra-frame location information. The random access resource frame number may indicate a frame number of a random access resource frame in which the same random access resource region is located. The intra-frame location information may indicate a location of the same random access resource region in the frame indicated by the random access resource frame number; and the intra-frame location information may include frequency domain starting location information, frequency domain ending location information, time domain starting location information, and time domain ending location information; or the intra-frame location information may include frequency domain starting location information, a frequency domain bandwidth, time domain starting location information, and time domain duration; or the intra-frame location information may include time domain location information, where the random access resource region may occupy, in frequency domain, an entire bandwidth occupied by a random access channel, and may occupy, in time domain, one or more time units indicated by the time domain location information; or the intra-frame location information may include frequency domain location information, where the random access resource region may occupy, in frequency domain, one or more frequency domain units indicated by the frequency domain location information, and may occupy, in time domain, an entire time period occupied by a random access channel; or the intra-frame location information may include one or more random access channel resource indexes, where each random access channel resource index may indicate a random access channel resource used by terminal device to send a random access request message.

Optionally, if the intra-frame location information includes one or more random access channel resource indexes, where each random access channel resource index may indicate a random access channel resource used by terminal device to send a random access request message, before the terminal device receives a random access reject message, the method may further include receiving, by the terminal device, a correspondence between a random access channel resource index and a random access channel resource, where the correspondence may be broadcast by the network device; or a correspondence between a random access channel resource index and a random access channel resource may be pre-stipulated in a protocol.

For an implementation of the method shown in FIG. 15, refer to operations performed by the foregoing terminal device 302.

In the method shown in FIG. 15, a communications standard used by a wireless communications system in which the terminal device is located may be the communications standard used by the wireless communications system shown in FIG. 3. Other implementation forms of the terminal device may also be various implementation forms of the terminal device 302.

In the method shown in FIG. 15, for a process in which the terminal device may interact with a network device in a wireless communications system, refer to the process shown in FIG. 4.

In the method shown in FIG. 15, for the resource location that is in the downlink control channel and that may be used when the terminal device receives the random access control message, refer to Case 1 and Case 2 of the foregoing resource location.

In the method shown in FIG. 15, for an optional implementation of the terminal set identification information received by the terminal device, refer to descriptions about the terminal set identification information in step S403 and step S404 in the process shown in FIG. 4.

In the method shown in FIG. 15, for format of a message received by the terminal device, an implementation of a downlink control channel resource occupied by the received random access control message, and a process, refer to descriptions about the terminal device 302 in the foregoing Example 1, Example 2, Example 3, and Example 4.

In conclusion, in this application, the network device may send the same random access control message for the random access procedures initiated by the N terminal devices in the M terminal device sets, where the same random access control message may indicate the same processing result that the network device may have determined for the N terminal devices, the message may include the terminal set identification information that may identify the N terminal devices; and after receiving the random access control message, the terminal device may obtain the terminal set identification information in the message, and when the N terminal devices identified by the terminal set identification information include the terminal device, may determine, based on the received random access control message, the processing result that the network device may have determined for the random access procedure initiated by the terminal device, where M and N are positive integers.

The network device may use the same random access reject message to indicate the same processing result for the random access procedures to the N terminal devices in the M terminal device sets. This can reduce control channel resources occupied for sending random access reject messages, and may resolve a problem in which control channels may become limited in random access procedures.

Further, the same random access control message for the same terminal device set may be sent in the same resource location in the downlink control channel. Therefore, the terminal devices in the set share the same resource location in the downlink control channel, thereby potentially reducing occupancy of downlink control channel resources.

Alternatively, the same random access control message for the M terminal device sets may be sent in the same resource location in the downlink control channel. Therefore, the terminal devices in the M terminal device sets may share the same resource location in the downlink control channel, further reducing occupancy of downlink control channel resources.

Persons skilled in the art should understand that the embodiments of the present invention may be provided as a method, a system, or a computer program product. Therefore, the embodiments of the present invention may use a form of hardware only embodiments, software only embodiments, or embodiments with a combination of software and hardware. Moreover, the embodiments of the present invention may use a form of a computer program product that is implemented on one or more computer-usable storage media (including but not limited to a disk memory, a CD-ROM, and an optical memory) that include computer-usable program code.

The embodiments of the present invention are described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory may generate an artifact that includes an instruction apparatus. The instruction apparatus may implement a specific function in one or more processes in the flowcharts and/or in one or more blocks in the block diagrams.

These computer program instructions may be loaded onto a computer or another programmable data processing device, so that a series of operations and steps may be performed on the computer or the another programmable device, thereby generating computer-implemented processing. Therefore, the instructions executed on the computer or the other programmable devices provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the embodiments of the present invention.

Obviously, persons skilled in the art can make various modifications and variations to the embodiments of the present invention without departing from the spirit and scope of the embodiments of the present invention. The embodiments of the present invention are intended to cover these modifications and variations provided that they fall within the scope of protection defined by the following claims and their equivalent technologies.

What is claimed is:

1. A network device, comprising:
   a processor;
   a non-transitory computer-readable storage medium storing a program to be executed by the processor, the program including instructions for:
      receiving a plurality of random access request messages from a plurality of terminal devices of M terminal device sets, wherein each terminal device of the plurality of terminal devices sends at least one random access request message of the plurality of random access request messages, wherein the plurality of random access request messages indicates initiation of a plurality of random access procedures by the plurality of terminal devices, and wherein M is a positive integer; and
      determining a same processing result for each random access procedure of the plurality of random access procedures initiated by the plurality of terminal devices, wherein the same processing result comprises one of an access message or a reject message to the plurality of random access request messages; and
   a transmitter, configured to send a same random access control message to the plurality of terminal devices of the M terminal device sets, wherein the same random access control message comprises the same processing result and terminal set identification information, and wherein the terminal set identification information indicates the plurality of terminal devices.

2. The network device according to claim 1, wherein the same random access control message further comprises a same resource location that is in a downlink control channel and that corresponds to the M terminal device sets.

3. The network device according to claim 2, wherein the transmitter is further configured to:
   before sending the same random access control message to the plurality of terminal devices, broadcast channel resource location information, wherein the channel resource location information indicates the same resource location.

4. The network device according to claim 1, wherein the same random access control message further comprises a resource location that corresponds to a same terminal device set to which the plurality of terminal devices belong and that is in a downlink control channel.

5. The network device according to claim 4, wherein the transmitter is further configured to:
   before sending the same random access control message to the plurality of terminal devices, broadcast channel resource location information, wherein the channel resource location information indicates the resource location that corresponds to the same terminal device set and that is in the downlink control channel.

6. A terminal device, comprising:
   a receiver, configured to receive a random access control message that is sent by a network device in response to a random access procedure initiated by the terminal device;
   a processor; and
   a non-transitory computer-readable storage medium storing a program to be executed by the processor, the program including instructions for:
      obtaining terminal set identification information from the random access control message received by the receiver, wherein the terminal set identification information identifies a plurality of terminal devices of M terminal device sets, and wherein M is a positive integer; and
      in response to determining that the plurality of terminal devices identified by the terminal set identification information comprises the terminal device, determining, based on the random access control message, a processing result, determined by the network device, for the random access procedure initiated by the terminal device, wherein the processing result comprises one of an access message or a reject message to the random access procedure.

7. The terminal device according to claim 6, wherein the random access control message further comprises a same resource location that is in a downlink control channel and that corresponds to the M terminal device sets.

8. The terminal device according to claim 7, wherein the receiver is further configured to:
   before receiving the random access control message, receive channel resource location information broadcast by the network device, wherein the channel resource location information indicates the same resource location.

9. The terminal device according to claim 6, wherein the random access control message further comprises a resource location that corresponds to a first terminal device set to which the terminal device belongs and that is in a downlink control channel.

10. The terminal device according to claim 9, wherein the receiver is further configured to:
    before the terminal device receives the random access control message, receive channel resource location information broadcast by the network device, wherein the channel resource location information indicates the resource location that corresponds to the first terminal device set to which the terminal device belongs and that is in the downlink control channel.

11. A method, comprising:
    receiving, by a network device, a plurality of random access request messages from a plurality of terminal devices of M terminal device sets, wherein each terminal device of the plurality of terminal devices sends at least one random access request message of the plurality of random access request messages, wherein the plurality of random access request messages indicates initiation of a plurality of random access procedures by the plurality of terminal devices, and wherein M is a positive integer;
    determining, by the network device, a same processing result for each random access procedure of the plurality of random access procedures initiated by the plurality of terminal devices of the M terminal device sets, wherein the same processing result comprises one of an access message or a reject message to the plurality of random access request messages; and sending, by the network device, a same random access control message to the plurality of terminal devices of the M terminal device sets, wherein the same random access control message comprises the same processing result and terminal set identification information, and wherein the terminal set identification information identifies the plurality of terminal devices.

12. The method according to claim 11, wherein the same random access control message further comprises a same resource location that is in a downlink control channel and that corresponds to the M terminal device sets.

13. The method according to claim 12, further comprising:

before sending the same random access control message, broadcasting, by the network device, channel resource location information indicating the same resource location.

14. The method according to claim 11, wherein the same random access control message further comprises a resource location that corresponds to a same terminal device set to which the plurality of terminal devices belong and that is in a downlink control channel.

15. The method according to claim 14, further comprising:

before sending the same random access control message, broadcasting, by the network device, channel resource location information, wherein the channel resource location information indicates the resource location that corresponds to the same terminal device set and that is in the downlink control channel.

16. A method, comprising:

initiating, by a terminal device, a random access procedure;

sending, by the terminal device, a random access request message to a network device;

receiving, by the terminal device from the network device, a random access control message responsive to the random access request message;

obtaining, by the terminal device, terminal set identification information from the random access control message, wherein the terminal set identification information identifies a plurality of terminal devices of M terminal device sets, and wherein M is a positive integer; and when determining that the plurality of terminal devices identified by the terminal set identification information comprises the terminal device, determining, by the terminal device based on the random access control message, a processing result that the network device determined for the random access procedure, wherein the processing result comprises one of an access message or a reject message to the random access procedure.

17. The method according to claim 16, wherein the random access control message further comprises a same resource location that is in a downlink control channel and that corresponds to the M terminal device sets.

18. The method according to claim 17, further comprising:

before receiving the random access control message, receiving, by the terminal device, channel resource location information broadcast by the network device, wherein the channel resource location information indicates the same resource location.

19. The method according to claim 16, wherein the random access control message further comprises a resource location that corresponds to a first terminal device set to which the terminal device belongs and that is in a downlink control channel.

20. The method according to claim 19, further comprising:

before receiving the random access control message, receiving, by the terminal device, channel resource location information broadcast by the network device, wherein the channel resource location information indicates the resource location that corresponds to the terminal device set to which the terminal device belongs and that is in the downlink control channel.

* * * * *